(12) United States Patent
Beverung et al.

(10) Patent No.: US 11,872,734 B2
(45) Date of Patent: Jan. 16, 2024

(54) TOOL SYSTEM FOR PRODUCING A WORKPIECE BY MEANS OF INJECTION MOLDING

(71) Applicant: Phoenix Contact GmbH & Co. KG, Blomberg (DE)

(72) Inventors: Dennis Beverung, Luegde (DE); Andreas Schubart, Horn-Bad Meinberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 17/314,065

(22) Filed: May 7, 2021

(65) Prior Publication Data

US 2021/0354351 A1 Nov. 18, 2021

(30) Foreign Application Priority Data

May 14, 2020 (DE) .................. 10 2020 113 103.8

(51) Int. Cl.
*B29C 45/14* (2006.01)
*B29C 45/26* (2006.01)

(52) U.S. Cl.
CPC .. *B29C 45/14065* (2013.01); *B29C 45/14073* (2013.01); *B29C 45/14819* (2013.01); *B29C 45/26* (2013.01); *B29C 2045/1409* (2013.01); *B29C 2045/14081* (2013.01); *B29C 2045/14163* (2013.01); *B29C 2045/14942* (2013.01)

(58) Field of Classification Search
CPC .............. B29C 45/14065; B29C 45/26; B29C 45/14819; B29C 45/14073; B29C 2045/4021; B29C 2045/4047; B29C 2045/4094; B29C 2045/1409
See application file for complete search history.

(56) References Cited

U.S. PATENT DOCUMENTS

| | | | | |
|---|---|---|---|---|
| 4,470,786 A | * | 9/1984 | Sano ...................... | H01L 21/565 425/149 |
| 5,639,403 A | * | 6/1997 | Ida .......................... | B29C 45/77 264/272.17 |
| 7,070,724 B2 | * | 7/2006 | Nakazawa ............ | B29C 45/572 264/328.8 |
| 7,811,497 B2 | * | 10/2010 | Balint ................. | B29C 45/1635 425/577 |

(Continued)

FOREIGN PATENT DOCUMENTS

CN 108068280 * 5/2018

OTHER PUBLICATIONS

Machine translation of CN108068280 as found on Google Patents (Year: 2022).*

*Primary Examiner* — Edmund H Lee
(74) *Attorney, Agent, or Firm* — LEYDIG,VOIT & MAYER, LDT.

(57) ABSTRACT

A tool system for producing a workpiece by injection-molding includes: a tool part which has a cavity for shaping the workpiece from an injection-molding compound; and an adjusting device, which has a drive, a drive shaft, and a plurality of adjusting elements which are operatively connected to the drive shaft and are adjustable via the drive shaft. Driven by the drive, the adjusting elements, each with an actuating section for acting on at least one portion of the workpiece, are adjustable relative to the cavity.

14 Claims, 3 Drawing Sheets

(56) References Cited

U.S. PATENT DOCUMENTS

| | | | |
|---|---|---|---|
| 10,688,700 B2* | 6/2020 | Faik | B29C 45/14336 |
| 2010/0244318 A1* | 9/2010 | Kobayashi | B29C 45/14073 |
| | | | 264/279 |

* cited by examiner

TOOL SYSTEM FOR PRODUCING A WORKPIECE BY MEANS OF INJECTION MOLDING

CROSS-REFERENCE TO PRIOR APPLICATION

Priority is claimed to German Patent Application No. DE 10 2020 113 103.8, filed on May 14, 2020, the entire disclosure of which is hereby incorporated by reference herein.

FIELD

The invention relates to a tool system for producing a workpiece by means of injection molding, and to a method for producing a workpiece.

BACKGROUND

Such a tool system comprises a tool part which has a cavity for shaping the workpiece from an injection-molding compound.

Such a tool system serves to produce a workpiece by means of injection molding, in particular by means of plastic injection molding. For production, an injection-molding compound is injected into the cavity of the tool part, wherein the cavity defines the shape of the workpiece and, after hardening of the injection-molding compound in the cavity, the workpiece can be removed from the tool part and processed further or installed, for example in a superordinate assembly, for example in a measuring device.

Such a tool system is intended, for example, to produce workpieces in which portions are inserted in advance into the cavity of the tool part as so-called inserts and insert-molded by the injection-molding compound. In this case, there is a need for simple manufacturing with exact positioning of the portion in the cavity, with the possibility of preferably insert-molding the portion in a desired manner in one process step. After the injection-molding compound has hardened, the manufactured workpiece should then be easily ejected and thus removed from the cavity.

SUMMARY

In an embodiment, the present invention provides a tool system for producing a workpiece by injection-molding, comprising: a tool part which has a cavity configured to shape the workpiece from an injection-molding compound; and an adjusting device, which has a drive, a drive shaft, and a plurality of adjusting elements which are operatively connected to the drive shaft and are adjustable via the drive shaft, wherein driven by the drive, the adjusting elements, each with an actuating section configured to act on at least one portion of the workpiece, are adjustable relative to the cavity.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
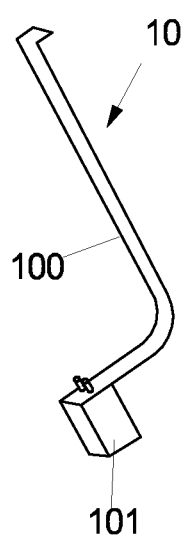
FIG. 1A is a view of a portion of a workpiece in the form of a circuit board assembly.

In an embodiment, the present invention provides a tool system and a method for producing the workpiece which allow simple manufacture of the workpiece with the possibility of insert-molding one or more portions, which are inserted as inserts into the cavity of a tool part, and the possibility of simple ejection.

Accordingly, the tool system has an adjusting device which has a drive, a drive shaft, and a plurality of adjusting elements which are operatively connected to the drive shaft and can be adjusted via the drive shaft. Driven by the drive, the adjusting elements, each with an actuating section for acting on at least one portion of the workpiece, can be adjusted relative to the cavity.

The drive can be formed, for example, by an electric motor, by a hydraulic drive, by a pneumatic drive, or also by a manual drive (for example in the form of a hand crank or the like).

The tool system thus has an adjusting device which is designed to act on a portion of the workpiece, in particular an insert, for example in the form of a circuit board arrangement, or on the workpiece as a whole. In particular, a portion can be positioned and held in position in the cavity of the tool part via the adjusting device so that insert-molding of the portion in the correct position in the cavity is made possible. In addition, the adjusting elements of the adjusting device can be designed to act on the manufactured workpiece in order to eject the workpiece from the cavity.

The adjusting elements of the adjusting device are moved jointly via the drive of the adjusting device. For this purpose, the adjusting elements are jointly operatively connected to the drive via a drive shaft in such a way that the adjusting elements can be adjusted in a coordinated manner by driving the drive shaft via the drive. The adjusting elements, each with an actuating section for acting on a portion of the workpiece or on the workpiece as a whole, can be brought into the region or out of the region of the cavity and can thus be adjusted relative to the cavity so that via the adjusting elements, the portion can be positioned, for example, in the cavity and the manufactured workpiece can be ejected from the cavity.

In one embodiment, the drive shaft is rotatable about an axis of rotation relative to the tool part. For this purpose, the drive shaft is rotatably mounted on the tool part and can be driven via the drive so that the drive shaft can be rotated relative to the tool part.

The drive shaft is operatively connected to the adjusting elements of the adjusting device so that the adjusting elements can be adjusted on the tool part by rotating the drive shaft. The adjusting elements can, for example, be arranged in a row next to one another along the axis of rotation of the drive shaft and, for example, be arranged regularly, i.e., equidistantly, or irregularly with respect to one another. This results in a linear arrangement of the adjusting elements, which can be adjusted relative to the cavity in order to act on a portion of the workpiece or on the workpiece as a whole.

In one embodiment, the adjusting elements are operatively connected to the drive shaft in such a way that the adjusting elements are adjusted perpendicularly to the axis of rotation when the drive shaft is rotated about the axis of rotation. A rotational movement of the drive shaft is thus converted into a linear adjusting movement of the adjusting elements. By adjusting the adjusting elements, the actuating sections of the adjusting elements can be moved relative to the cavity so that the actuating sections can, for example, be brought into a defined position for positioning a portion of the workpiece in the cavity and can be adjusted out of the defined position in order to, for example, allow insert molding of the portion and to eject the manufactured workpiece from the cavity after the injection-molding process has been completed.

For producing the operative connection, the drive shaft can have a coupling device, for example. The coupling device can be formed, for example, by a plurality of coupling sections for coupling to the adjusting elements, wherein each of the coupling sections is advantageously assigned to one of the adjusting elements and the adjusting elements can thus be adjusted by moving the coupling sections. The coupling sections are, for example, arranged fixedly on the drive shaft and can have the shape of cam disks or cams which project radially with respect to the axis of rotation and, with a circumferential, non-rotationally symmetrical lateral surface, act on the respectively assigned adjusting elements. The drive shaft is thus designed in the manner of a camshaft in which coupling sections in the form of cam disks or cams are assigned to the individual adjusting elements and, by rotating the drive shaft, an adjusting movement of the adjusting elements can thus be brought about at least approximately perpendicularly to the axis of rotation of the drive shaft.

By rotating the drive shaft, the coupling sections are moved and thus adjust the adjusting elements. Advantageously, at least some of the coupling sections differ from one another in such a way that moving the coupling sections results in an asynchronous movement of the adjusting elements, i.e., when the drive shaft is rotated, the adjusting elements are thus not moved uniformly with one another but rather in different ways, for example in a time-offset manner, with different strokes and/or with differing adjustment speeds. Since the coupling sections are fixedly arranged on the drive shaft, the movements of the adjusting elements are coordinated with one another so that when the drive shaft rotates, the adjusting elements are adjusted in a predetermined manner and the actuating sections of the adjusting elements are thus moved in the cavity.

By operatively connecting the adjusting elements to the drive shaft, the adjusting elements are moved relative to the cavity of the tool part, in particular perpendicularly to the axis of rotation of the drive shaft, due to a coupling via the coupling sections. Here, the coupling sections can be designed, for example, to exert a compressive force, for example radially to the axis of rotation, on the adjusting elements in order to move the actuating sections of the adjusting elements into the cavity. By driving the drive shaft, the coupling sections of the drive shaft, which are designed, for example, as cam disks or cams, act on the adjusting elements in that the adjusting elements abut, for example, on an outer circumferential lateral surface of the coupling sections so that a force is exerted on the adjusting elements via the coupling sections. In order to allow an adjustment of the adjusting elements in the opposite direction radially inward, for example in a retraction direction out of the region of the cavity, the adjusting elements can be preloaded, for example, by spring elements with respect to a wall section of the tool part so that the adjusting elements can be returned in a spring-supported manner.

The coupling sections in the form of the cam disks or cams can, for example, be arranged modularly on the drive shaft and can thus be replaced, for example, in order to adapt the tool system for processing different portions in the form of inserts. Here, the coupling sections can be designed as separate segments so that the coupling sections can also be removed and replaced individually. In the mounted position, the coupling sections are fixedly arranged on the drive shaft and are thus moved together with the drive shaft when the drive shaft is rotated.

The adjusting elements can in particular be designed to hold the portion of the workpiece in position in the cavity for insert molding with the injection-molding compound. The positioning of the portion, in particular of a circuit board assembly, can here, for example, be monitored in a force-controlled manner, wherein in the event of an error, for example in the case of incorrect positioning, the injection-molding process can be terminated. By coordinated movement of the adjusting elements, brought about by the drive of the adjusting device and the operative connection to the drive shaft, the adjusting elements can then be adjusted during injection-molding in such a way that the adjusting elements are, for example, removed from the portion successively in a coordinated manner so that the portion can be completely insert-molded with the injection-molding compound in one process step. In this case, the adjustment of the adjusting elements can be controlled, for example, in a sensor-assisted manner, for example by using melt pressure sensors and/or tool wall temperature sensors, so that the adjusting elements can be moved, for example as a function of the filling of the cavity by the injection-molding compound, and control is possible, for example in a closed control loop. The drive can be actuated in particular as a function of measurement signals of the sensors.

Additionally or alternatively, the adjusting elements can be designed to eject the workpiece from the cavity after shaping from the injection-molding compound. The adjusting elements can thus be moved in a coordinated manner so that the workpiece can be pushed out of the cavity and thus removed from the cavity in a simple manner. For the ejection, the adjusting elements can, for example, be moved jointly into the cavity in an ejection direction, wherein the adjusting elements can be adjusted in a force-controlled manner in order to avoid damage to the workpiece during ejection.

For adjusting the adjusting elements, the drive shaft can be rotated in a continuous manner and thus at a uniform angular velocity, wherein the movement of the adjusting elements is defined by the shape of the coupling sections of the coupling device. However, it is also conceivable and possible to adjust the drive shaft stepwise and thus to carry out the movement of the drive shaft in movement phases in that the drive shaft is rotated by a predetermined angle of rotation, then stopped, then rotated again in the same direction of rotation or in a different direction of rotation by a predetermined, different, or the same angle of rotation, etc.

Embossing processes can also be carried out on the workpiece by the adjusting elements, for example within the framework of an injection-molding process.

A servomotor, which allows precise actuation of the drive shaft for rotation to a defined angular position at a defined angular velocity, can, for example, be used as the (electromotive) drive. For this purpose, the servomotor can be formed by an electric motor that is equipped with a sensor for determining the position. The rotational position of the motor shaft ascertained by the sensor is continuously transmitted to a control electronics, called a servo controller, which controls the movement of the motor.

In an embodiment the invention also provides a method for producing the workpiece by means of injection-molding, comprising: shaping the workpiece from an injection-molding compound in a cavity of a tool part of a tool system, and using an adjusting device of the tool system, which has a drive, a drive shaft, and a plurality of adjusting elements which are operatively connected to the drive shaft and can be adjusted via the drive shaft, for acting on at least one portion of the workpiece in that, driven by the drive, the adjusting elements of the adjusting device, each with an actuating section, are adjusted relative to the cavity.

The advantages and advantageous embodiments described above for the tool system also apply analogously to the method so that reference is made to the above statements in this respect.

By means of a tool system and a method of the type described for producing a workpiece, it becomes possible to easily and flexibly realize adjusting movements of adjusting elements and thereby a positioning of a portion of a workpiece or of the workpiece as a whole relative to a tool part even in a tight installation space when manufacturing small workpieces. By using tool sensors, a control can be implemented, in particular in the manner of a closed control loop, which enables process control, in particular when process fluctuations are compensated for, for example during a filling process with the injection-molding compound, for example in the event of deviations in the material viscosity.

In this case, the adjusting device can also have several, for example two or three or even more, drives to each of which several adjusting elements are assigned so that several groups of adjusting elements can be moved independently of one another in order to act on one or more portions of a workpiece or on the workpiece as a whole.

Figure 1B:
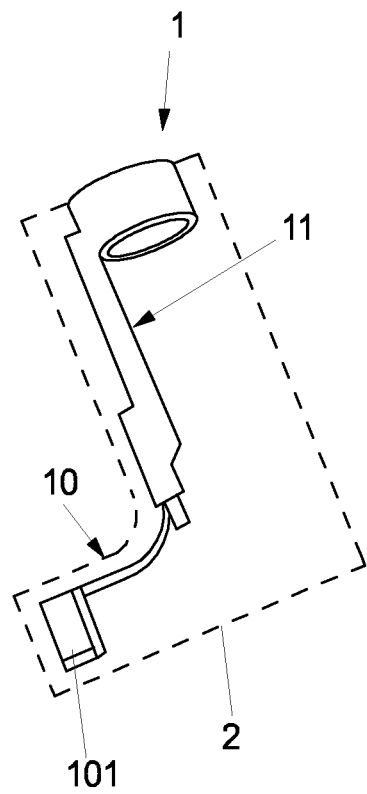
FIG. 1B is a view of a workpiece manufactured by insert molding the portion with a molded part.

FIGS. 1A and 1B show a sequence for manufacturing a workpiece 1 (FIG. 1B) which is to be installed in a superordinate assembly, for example in a measuring device.

Within the framework of manufacturing the workpiece 1, a portion 10, as an insert, is insert-molded with a molded part 11 in an injection-molding method. The workpiece 1 thus manufactured is mounted, for example, on a housing of a measuring device 2.

In the illustrated example, the portion 10 is formed by a circuit board assembly having a flexible circuit board 100 and an adapter board 101 arranged thereon for connecting an electrical lead. Arranged on the flexible circuit board 100 is, for example, a sensor, for example a temperature sensor, which is insert-molded within the framework of the injection-molding method with the (thermally conductive) material of the molded part 11, for example a thermoplastic material. The workpiece 1 thus created is mounted on the housing of the assembly 2.

In the case of a workpiece 1, as illustrated in an example in FIG. 1B, it is necessary to insert a portion 10, in the example shown a circuit board assembly with a flexible circuit board 100, as an insert into a tool system and to insert mold it with an injection-molding compound in an injection process. In this case, there is a need for a simple process in which the portion 10 is insert molded in a single process section, if possible, with the injection-molding compound for shaping the molded part 11 on the portion 10. In doing so, it is necessary to position the portion 10 in the correct position in a tool system in order to ensure that the portion 10 is insert molded with the material of the molded part 11 in the correct position.

A tool system 3 shown in FIGS. 2 to 5 in one exemplary embodiment has two tool parts 30, 31 which are attached to one another for an injection-molding process and together delimit a cavity 300 into which an injection-molding compound for forming a workpiece 1 is injected within the framework of the injection-molding process. The cavity 300, which in the illustrated exemplary embodiment is formed in particular in the tool part 30, provides the design of the workpiece 1 as a negative mold so that after the injection-molding compound has been injected and has hardened in the cavity 300, the workpiece 1 can be removed and processed further.

In the illustrated exemplary embodiment, an adjusting device 32 is provided which has an electromotive drive 320, for example in the form of a servomotor, which drives a drive shaft 321. A coupling device 322 is arranged on the drive shaft 321 and has a plurality of coupling sections 322A-322E in the form of cam disks or cams projecting radially with respect to the drive shaft 321 and serving to act on an arrangement of adjusting elements 323.

In the illustrated exemplary embodiment, the adjusting elements 323 are guided linearly displaceably on a wall section 302 of the tool part 30. The adjusting elements 323 can respectively be adjusted perpendicularly to an axis of rotation D about which the drive shaft 321 is rotatable, relative to the tool part 30 and interact with a respectively assigned coupling section 322A-322E via one end section 324 each. A first adjusting element 323A is operatively connected to a coupling section 322A, a second adjusting element 323B to a coupling section 322B, a third adjusting element 323C to a coupling section 322C, a fourth adjusting element 323D to a coupling section 322D, and a fifth adjusting element 323E to a coupling section 322E.

The adjusting elements 323, 323A-323E are arranged in a row next to one another along the axis of rotation D and thus form a linear arrangement of adjusting elements 323, 323A-323E. In this case, the adjusting elements 323, 323A-323E are arranged equidistantly from one another along the axis of rotation D.

Figure 5:
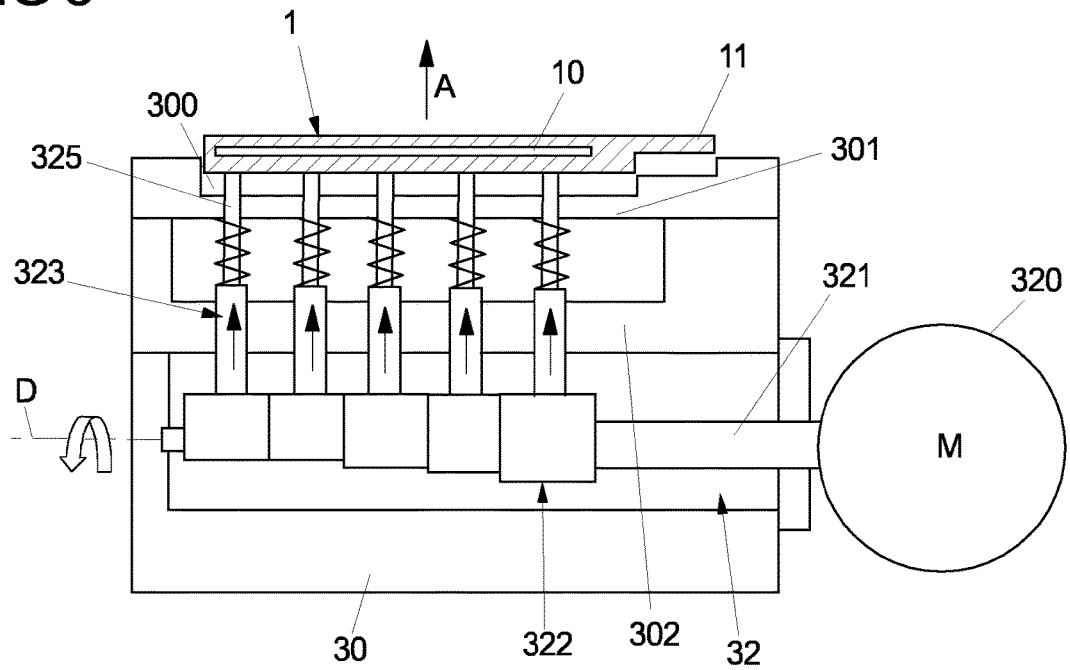
FIG. 5 is a view of the tool system when ejecting the manufactured workpiece.

The adjusting elements 323, 323A-323E are respectively spring-preloaded via a spring element 326 with respect to a wall section 301 of the tool part 30. With an actuating section 325, the adjusting elements 323, 323A-323E respectively extend through the wall section 301 and project into the region of the cavity 300 so that the adjusting elements 323, 323A-323E can be brought into interaction with a portion 10 of a workpiece 1 accommodated in the cavity 300 as shown in FIG. 2 or with the workpiece 1 as a whole as shown in FIG. 5.

The drive shaft 321 with the coupling device 322 arranged thereon is designed in the manner of a camshaft. The coupling sections 322A-322E in the form of the cam disks or cams are not rotationally symmetrical and project radially with respect to the drive shaft 321, wherein each adjusting element 323, 323A-323E is in sliding contact with a circumferentially outer lateral surface of the respectively assigned coupling section 322A-322E, and the actuating position of the adjusting elements 323, 323A-323E can thus be changed by rotating the drive shaft 321 with the coupling sections 322A-322E arranged thereon.

The coupling sections 322A-322E of the coupling device 322 may be of modular design, for example, and may optionally be replaced individually or together. The coupling sections 322A-322E define an adjusting movement of the adjusting elements 323, 323A-323E during a rotational movement of the drive shaft 321, wherein the coupling sections 322A-322E differ from one another and the adjusting movement of the adjusting elements 323, 323A-323E thus takes place asynchronously and not uniformly when the drive shaft 321 is rotated.

Figure 2:
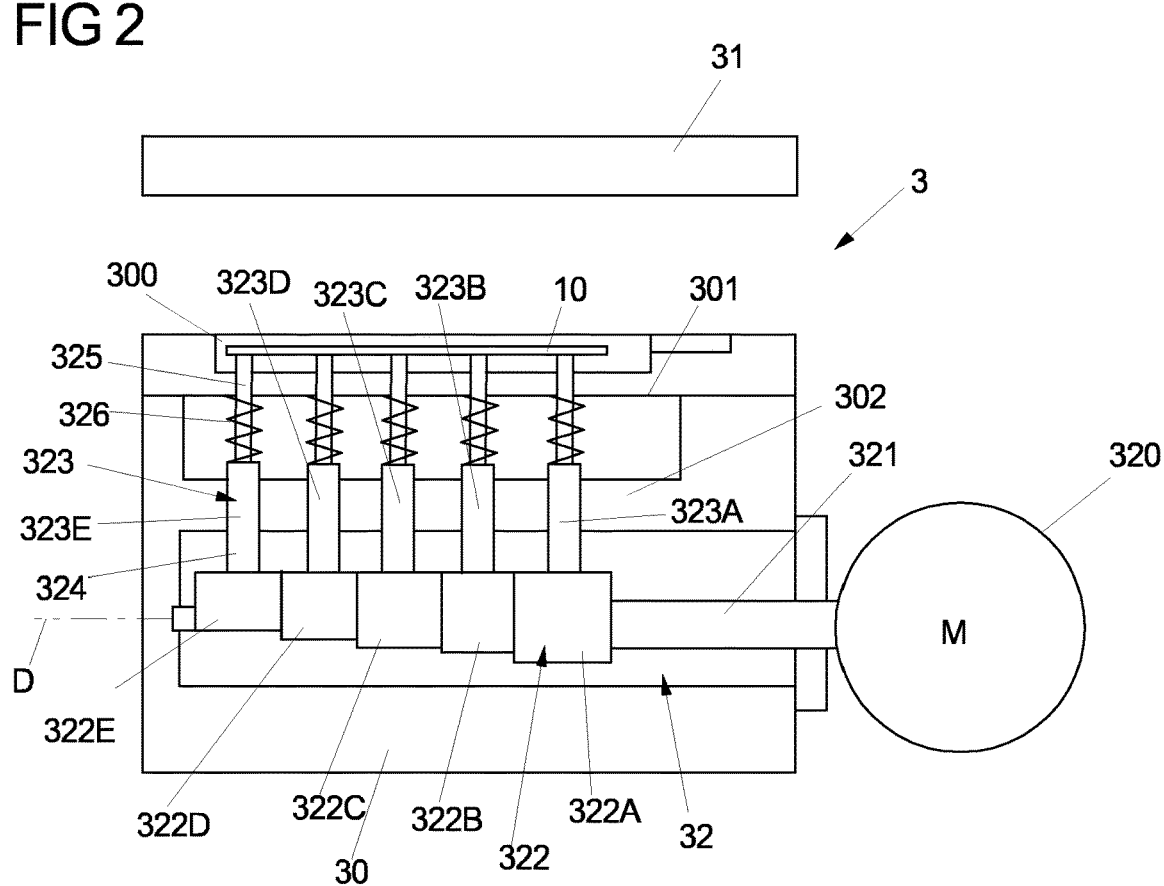
FIG. 2 is a schematic view of a tool system for producing a workpiece by means of injection molding.

In an initial position before the beginning of an injection-molding process, illustrated in FIG. 2, the actuating sections 325 of the adjusting elements 323, 323A-323E can, for example, project into the cavity 300 with the same length in order to position the portion 10 as an insert in the cavity 300 for the subsequent injection-molding process.

Figure 3:
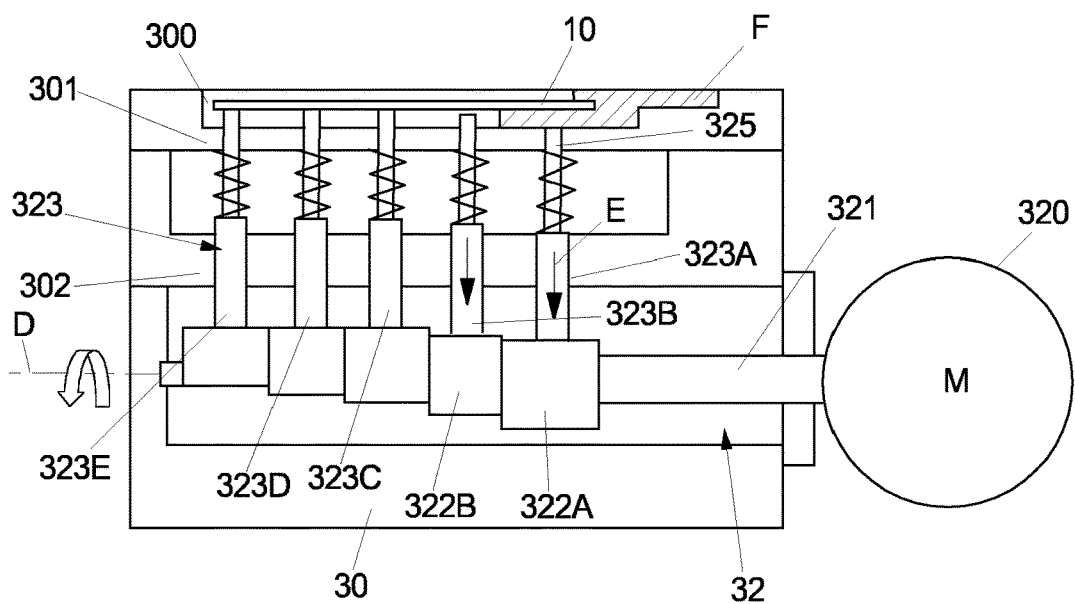
FIG. 3 is a view of the tool system when filling a cavity with an injection-molding compound in order to produce the workpiece.

Within the framework of an injection-molding process, illustrated in FIG. 3, an injection-molding compound F is injected into the cavity 300 (in FIGS. 3 to 5, the tool system 3 is shown without the upper tool part 31 for the sake of simplicity) so that the injection-molding compound F flows around the portion 10. In order to allow the portion 10 to be insert molded in one process step, the drive shaft 321, driven by the drive 320, is rotated so that the coupling sections 322A-322E are adjusted about the axis of rotation D by an angle of rotation and the assigned end sections 324 of the adjusting elements 323, 323A-323E thus slide along the lateral surfaces of the coupling sections 322A-322E. In this way, the adjusting elements 323A-323E are retracted in a retraction direction E and thus brought out of the region of the cavity 300, wherein this does not take place simultaneously within the framework of the injection-molding process but rather as a function of the inflow of the injection-molding compound F in a time-offset sequence.

Thus, as can be seen from FIG. 3, during injection of the injection-molding compound F, the first adjusting element 323A is retracted first, followed by the adjusting element 323B. The portion 10 is thus still held in position by the remaining adjusting elements 322C-322E and is thus positioned in the cavity 300.

Figure 4:
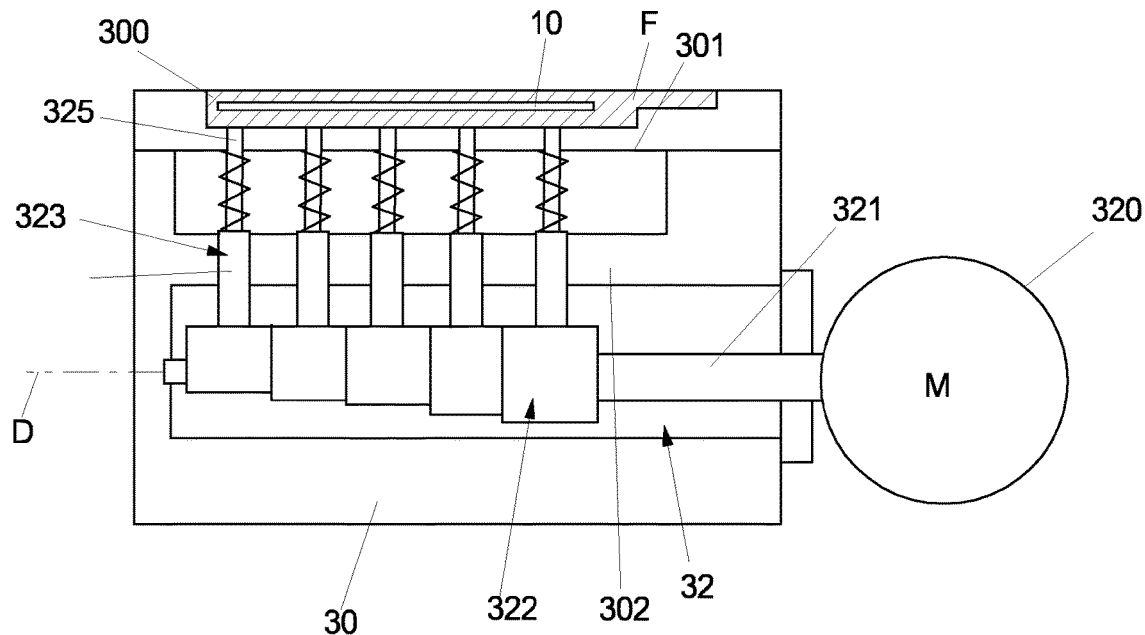
FIG. 4 is a view of the tool system when the cavity is filled.

When the drive shaft 321 rotates further, as can be seen from FIG. 4, the further adjusting elements 323C-323E are then also retracted in a coordinated manner until all adjusting elements 323 have been moved out of the region of the cavity 300.

The coordinated movement of the adjusting elements 323A-323E is defined by the shaping of the coupling sections 322A-322E of the drive shaft 321 designed as a camshaft. The coupling sections 322A-322E are arranged in a rotationally fixed manner on the drive shaft 321 and are thus rotated together with the drive shaft 321, wherein the coupling sections 322A-322E are driven via the common drive 320.

Since the adjusting elements 323 are retracted in succession in a coordinated manner, the portion 10 can, as can be seen from FIG. 4, be completely insert molded in one process step with the injection-molding compound F within the framework of the injection-molding process, with reliable and precise positioning of the portion 10 via the adjusting elements 323 during the injection-molding process.

The injection-molding process can in this case be controlled by sensors. Melt pressure sensors or temperature sensors can thus be arranged in the region of the cavity 300 and can be used to monitor the inflow of the injection-molding compound F in order to in this way control the adjusting movement of the adjusting elements 323, for example in a closed control loop.

The positioning of the portion 10 via the adjusting elements 323 may also be controlled via force sensors, for example, in order to ensure precise positioning of the portion 10 in the cavity 300. In the event of an error, for example if the portion 10 is positioned incorrectly, the injection-molding process can be interrupted in order to correct the positioning.

The adjusting movement of the adjusting elements 323 can take place by continuous movement of the drive shaft 321, driven by the drive 320, i.e., at a constant angular velocity of the drive shaft 321. However, it is also conceivable to adjust the drive shaft 321 stepwise via predefined angles of rotation in order to in this way adjust the adjusting elements 323 stepwise in a coordinated manner.

The coupling sections 322A-322E are shaped dissimilarly to one another. In this way, the adjusting elements 323A-323E can be adjusted, for example, with different adjusting strokes, with a time offset, and also with different adjustment speeds, wherein the adjusting movements of the adjusting elements 323A-323E are coordinated with one another by the shaping of the coupling sections 322A-322E and the actuating position of each adjusting element 323, 323A-323E depends on the currently assumed rotational position of the drive shaft 321.

When the injection-molding compound F has been injected into the cavity 300 and the workpiece 1 thus formed has hardened, the workpiece 1 can be removed from the cavity 300. For this purpose, the adjusting elements 323 can be extended together and synchronously to one another, as can be seen from FIG. 5, for example by further rotating the drive shaft 321 in the same direction of rotation as before, so that the workpiece 1 is pushed out of the cavity 300 and thus ejected in an ejection direction A which is opposite to the retraction direction E. The workpiece 1 can thus be removed and processed further.

Additionally or alternatively to the positioning of a portion 10 and to the ejection of the finished shaped workpiece 1, the adjusting elements 323 of the adjusting device 32 can also serve, for example, for an embossing process for impressing a shape on the workpiece 1.

By adapting the coupling sections 322A-322E, for example by replacing modular coupling sections 322A-322E attached to the drive shaft 321 in the manner of cam disks or cams, the tool system 3 can be adapted to a workpiece 1 to be shaped and to a portion 10 to be provided as an insert.

In the illustrated embodiment, a (single) drive 320 is provided with a drive shaft 321 and an arrangement of adjusting elements 323, 323A-323E. In another exemplary embodiment, several drives, each having an assigned drive shaft 321 and an assigned arrangement of adjusting elements 323, 323A-323E, may also be provided so that several arrangements of adjusting elements 323, 323A-323E are present for acting on one or more portions 10 of a workpiece 1 and on the workpiece 1 as a whole.

The idea underlying the invention is not limited to the exemplary embodiments described above but can also be implemented in another manner.

By using a tool system of the type described, any workpieces with or without an insert can be shaped. In this respect, the present invention can be used not only for the manufacture of a workpiece for a measuring device.

By means of a tool system of the type described, workpieces with a small installation space can be manufactured precisely with exact positioning of a portion that realizes an insert, with a simple injection-molding process and a simple, automatable operation mode.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Workpiece
10 Portion (circuit board assembly)
100 Flexible circuit board
101 Sensor assembly
11 Molded part
2 Superordinate assembly (for example measuring device)
3 Tool system
30 Tool part
300 Cavity
301, 302 Wall section
31 Tool part
32 Adjusting device
320 Drive
321 Drive shaft
322 Coupling device
322A-E Coupling sections
323 Adjusting elements
323A-E Adjusting elements
324 End section
325 Actuating section
326 Spring element
A Ejection direction
D Axis of rotation
E Retraction direction
F Injection-molding compound

What is claimed is:

1. A tool system for producing a workpiece by injection-molding, comprising:
a tool part which has a cavity configured to shape the workpiece from an injection-molding compound; and
an adjusting device, which has a drive, a drive shaft, and a plurality of adjusting elements which are operatively connected to the drive shaft and are adjustable via the drive shaft,
wherein driven by the drive, the adjusting elements, each with an actuating section configured to act on at least one portion of the workpiece, are adjustable relative to the cavity,
wherein the plurality of adjusting elements are configured to hold the at least one portion in position in the cavity so as to enable insert molding of the at least one portion within the cavity with the injection-molding compound, a positioning of the at least one portion being monitored in a force-controlled manner.

2. The tool system of claim 1, wherein the drive shaft is rotatable about an axis of rotation relative to the tool part.

3. The tool system of claim 2, wherein the adjusting elements are arranged in a row next to one another along the axis of rotation.

4. The tool system of claim 2, wherein the adjusting elements are spaced apart from one another along the axis of rotation.

5. The tool system of claim 2, wherein the adjusting elements are operatively connected to the drive shaft in such a way that the adjusting elements are adjusted perpendicularly to the axis of rotation when the drive shaft is rotated about the axis of rotation.

6. The tool system of claim 1, wherein the drive shaft has a coupling device configured to produce the operative connection to the adjusting elements.

7. The tool system of claim 6, wherein the coupling device has a plurality of coupling sections configured to couple to the adjusting elements.

8. The tool system of claim 7, wherein each of the coupling sections is assigned to one of the adjusting elements.

9. The tool system of claim 7, wherein the drive shaft comprises a camshaft, and
wherein the coupling sections of the coupling device form cams configured to act on the adjusting elements.

10. The tool system of claim 7, wherein by rotating the drive shaft, the coupling sections are moved and the adjusting elements assigned to the coupling sections are adjusted thereby.

11. The tool system of claim 7, wherein at least individual coupling sections differ from one another such that when the drive shaft rotates, the adjusting elements assigned to the individual coupling sections move asynchronously.

12. The tool system of claim 1, wherein the adjusting elements are spring-preloaded with respect to a wall section of the tool part.

13. The tool system of claim 1, wherein the adjusting elements are configured to eject the at least one workpiece from the cavity after shaping from the injection-molding compound.

14. The tool system of claim 1, further comprising:
a plurality of tool sensors configured to provide a closed control loop to determine deviations during the producing.

* * * * *